Patented June 27, 1972

3,672,942

PROCESS FOR IMPREGNATING POROUS METAL ARTICLES

Edward W. Neumann, Raleigh, N.C., and Richard Borowski, New Britain, Conn., assignors to Loctite Corporation, Newington, Conn.
No Drawing. Continuation-in-part of application Ser. No. 790,873, Jan. 13, 1969. This application Dec. 24, 1969, Ser. No. 888,060
Int. Cl. B44d 1/34
U.S. Cl. 117—62.2
15 Claims

ABSTRACT OF THE DISCLOSURE

Porous articles can be sealed and impregnated without heat cure by (1) impregnating the article with the anaerobic combination of an acrylate monomer and a redox catalyst system; and (2) following the impregnation step by treating the impregnated article with an accelerator of free radical polymerization.

CROSS REFERENCE TO RELATED APPLICATION

This is a continuation-in-part of copending application Ser. No. 790,873, which was filed on Jan. 13, 1969, now abandoned.

BACKGROUND OF THE INVENTION

Porous, rigid articles, and particularly porous metal articles such as castings and sintered metal parts, frequently must be sealed and impregnated (for simplicity, hereinafter generally referred to jointly as "sealed") before use. This is necessary to make the article capable of withstanding liquid or gas pressure during use, and also to increase its density, improve its strength, reduce corrosion, and frequently to prepare the surface of the article for a subsequent painting or plating operation. A wide variety of porous metal articles are used commercially today, and are manufactured from a wide variety of metals. While zinc, copper, brass, and various alloys are not uncommon, by far the most important starting materials which frequently need to be sealed are wood and ceramics.

The prior art has recognized the need to seal these articles for many years. The earliest sealing process generally involved the use of either an inorganic sealant, such as sodium silicate, or a natural organic substance such as varnish. In more recent years, substances such as unsaturated alkyds, epoxides, and various other unsaturated monomers such as diallylphthalate have been used. See for example U.S. Pats. 3,345,205 to Raech, issued Oct. 3, 1967, 2,932,583 to Grana, issued Apr. 12, 1960, and 2,554,254 to Kroft, issued May 22, 1951.

To date no truly satisfactory process has been developed. After treatment by most prior art processes, significant percentages of the treated articles commonly are found to be inadequately sealed. Further, no fully acceptable impregnation process has been developed which does not require the use of either or both of a pressure cycle during the impregnation operation and a high temperature drying or curing cycle after the impregnation step. Attempts have been made to eliminate the pressure cycle, but the result has been an undesirably high percentage of unsuccessfully sealed articles.

Efforts also have been made to obviate the need for a heat cure by using a "catalyzed" impregnant. For example, a low viscosity epoxide monomer can be mixed with a hardener therefore, and the mixture used as an impregnant. Or an unsaturated "vinyl type" monomer such as diallylphthalate can be mixed with a peroxide and the combination used as an impregnant. Unfortunately, there have been several inherent shortcomings in the use of catalyzed impregnants. If the impregnant is sufficiently active to cure without a heat cycle, the rate of cure will be such at normal impregnation temperatures that the usable life of the impregnant is relatively short; the viscosity of the impregnant increases as the cure progresses, thus producing constant variations in impregnation efficiency. Conversely, when less active impregnants are used to eliminate the changes of viscosity, heat cures become necessary.

Additionally, articles which have been impregnated by prior art processes and with prior art impregnants generally have not been successfully adapted to post-impregnation surface treatment, such as painting or plating. If the impregnated article is treated with a cleaning solution in order to remove the impregnant from the surface of the article, sufficient impregnant is leached from the surface pores of the article to leave microscopic pits over the entire surface which, in turn, produce an unsatisfactory rough, pitted surface upon subsequent surface treatment. These pits also serve to entrap, e.g., plating acids or paint solvents, which commonly destroy the desired finishes.

If, on the other hand, the impregnant is allowed to remain on the surface of the articles until after the curing operation, the impregnant on the surface is hardened as well as the impregnant in the pores, and grinding, buffing or strong chemical action is required to clean the surface of the articles. Such operations adversely affect the surface characteristics or tolerances of the articles, and in addition are extremely time consuming and laborious tasks.

It is the purpose of this invention to provide a process which is not encumbered with the above described problems which have plagued the prior art, and specifically to provide a process for impregnating porous, rigid articles which does not require the use of pressure impregnating cycles or heat curing operations, and which produces directly a surface suitable for painting or plating.

The process of this invention involves impregnating rigid, porous articles with an anaerobic impregnant, and subsequently treating the surface of the impregnated articles with a polymerization accelerator for the impregnant which is used. Usually the impregnation will be conducted by use of a vacuum cycle wherein the interstices of the porous articles are evacuated by means of a vacuum, e.g., a vacuum of about five inches of mercury absolute pressure, following which the articles are treated with the impregnant. Upon release of the vacuum, the impregnant is drawn into the interstices of the articles. The polymerization accelerator, where practical, generally is dissolved in a solvent to facilitate handling and to provide surface cleaning of the impregnated articles.

A typical process involving the inventive concept disclosed herein is represented by the following steps: (a) subjecting porous metal articles to a vacuum to substantially evacuate the interstices thereof, such as an absolute pressure of less than about five inches of mercury; (b) after the interstices of the articles have been adequately evacuated, treating the articles with the impregnant, such as by submerging them in the impregnant; (c) releasing the vacuum while the articles are still in contact with the impregnants; and (d) subjecting the surface of the impregnated metal articles with a polymerization accelerator for the impregnant, such as by spraying with, or submerging the parts in, a solvent solution of the accelerator.

DISCUSSION OF THE INVENTION AND ITS PREFERRED EMBODIMENTS

The process described herein can be used successfully for the impregnation of various porous, rigid articles. (As used herein, the word "rigid" is intended to refer to relatively inflexible and gas impermeable materials, as contrasted with such flexible, permeable materials as rubber, fabrics, fibre mat, etc.) However, the invention hereafter generally will be described in terms of metal articles, since it is in this application that the process has particular utility and produces exceptional benefits.

(A) The metal pieces

The basic nature of the porous metal articles to be impregnated and sealed as disclosed herein is not a critical element of the invention. Porous metal articles are prepared by various methods known in the art, and essentially all can be successfully impregnated by the use of this invention.

The first of the two common methods of preparing such articles is by casting, wherein a molten metal is poured into a preformed mold (generally made of sand or other high temperature material), where the molten metal is allowed to solidify. Articles of this type are frequently subject to small imperfections and pores, particularly near the surface of the casting. The second of the common methods of forming the metal articles in question is by the sintering of preformed powdered metal pieces. This process generally involves pressing a mass of fine metallic particles into a predetermined shape or configuration, and then sintering the pressed part at a temperature near the melting point of the metal involved to allow fusion of the various particles to take place. In certain applications it is possible to eliminate the need for sintering, such as where low strength in the finished product is acceptable or desirable. Materials of the sintered metal type generally have a relatively uniform system of pores or interstices throughout the entire article.

The most common metals used in the preparation of metal parts by casting or sintering are copper, zinc, aluminum, various alloys of these three metals (particularly brass), and iron. Porous articles of these metals all can be sealed successfully by the use of the invention disclosed herein. Also, less commonly used metals such as various steels, including stainless steels, silver, platinum, chromium and tin also can be sealed by this process.

Generally, the maximum pore size in the porous articles should be about 50 microns (about 0.002"). With larger pore sizes, the structural integrity of the article is subject to question, and sealing is more difficult. However, by increasing the viscosity of the impregnant, porous articles having a larger pore sizes can be successfully sealed if the demands upon the sealed article will not be excessive. The process of this invention has been found capable of successfully sealing porosity of up to about 150 microns (about 0.006").

(B) The impregnant

The impregnants which are used in the process of this invention are anaerobic sealant compositions. Oxygen serves to inhibit the polymerization of certain unsaturated monomers, thus making it possible to catalyze them well in advance of the time of intended use. As long as the monomer-catalyst mixture is properly exposed to oxygen, polymerization will not take place over extended periods of time, typically several months and in many cases for more than a year. However, under anaerobic (esstentially oxygen free) conditions, the delicate balance between initiation and inhibition of polymerization is destroyed and the composition will begin to cure. Anaerobic conditions are reached in the interior of the porous metal parts when processed according to the invention disclosed herein.

The most desirable monomers for use in anaerobic systems are polymerizable acrylate esters. When used in the process of this invention, preferably at least a portion of the acrylate monomer is a di- or other polyacrylate ester. These polyfunctional monomers produce cross-linked polymers, which serve as more effective and more durable sealants.

The most highly preferred acrylate esters which can be used in the compositions disclosed herein are polyacrylate esters which have the following general formula:

(1) 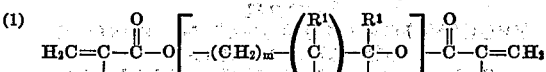

wherein $R^1$ represents a radical selected from the group consisting of hydrogen, lower alkyl of from 1 to about 4 carbon atoms, hydroxy alkyl of from 1 to about 4 carbon atoms, and

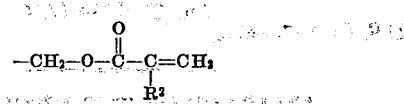

$R^2$ is a radical selected from the group consisting of hydrogen, halogen, and lower alkyl of from 1 to about 4 carbon atoms; $R^3$ is a radical selected from the group consisting of hydrogen, hydroxyl, and

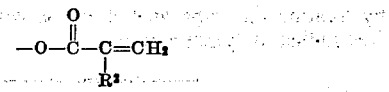

$m$ is an integer equal to at least 1, e.g., from 1 to about 15 or higher, and preferably from 1 to about 8 inclusive; $n$ is an integer equal to at least 1, e.g., 1 to about 20 or more, and preferably between about 2 and about 6; and $p$ is one of the following: 0.1.

The polymerizable polyacrylate esters utilized in accordance with the invention and corresponding to the above general formula are exemplified by, but not restricted to, the following materials: di-, tri- and tetraethyleneglycol dimethacrylate; dipropyleneglycol dimethacrylate; polyethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; neopentylglycol diacrylate; and trimethylolpropane triacrylate.

While polyacrylate esters—and particularly the polyacrylate esters described in the preceding paragraphs—have been found particularly desirable, monofunctional acrylate esters (esters containing one acrylate group) also may be used.

The most common of these monofunctional esters are the alkyl esters such as methyl methacrylate, ethyl methacrylate, propyl methacrylate and isobutyl methacrylate. Many of the lower molecular weight alkyl esters are quite volatile and frequently it is more desirable to use a higher molecular weight homolog, such as decyl methacrylate or dodecyl methacrylate.

When dealing with monofunctional acrylate esters, it is preferable to use an ester which has a relatively polar alcoholic moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates can be used in the impregnation system. However, when other acrylates are used they preferably are used in combination with one or more members from either or both of the above described classes of acrylate monomers. Most preferably, polyacrylates having the chemical Formula 1, given above, comprise at least about fifty percent by weight of the acrylates used since these monomers have been found clearly superior in anaerobic sealants, as is more fully discussed below.

As indicated above, a particular benefit of the impregnation system disclosed herein is that it is a catalyzed system capable of curing at room temperature, and yet excellent control of the viscosity of the uncured sealant is provided. Rarely if ever will the viscosity of the sealant more than double, even if allowed to stand for six months or longer after catalyzation. In the general case, the increase under these conditions will not be more than 25% to 50%. The sealant viscosity at the time of catalyzation generally is from about 1 to about 1000 centipoises and preferably is between about 5 and 500 centipoises. The most highly preferred range is from about 5 to about 150 centipoises. Viscosities higher than those indicated make penetration of the sealant into the porous part difficult or impossible; extremely low viscosity sealants tend to "leak" from the part subsequent to penetration. Surface tension of the sealant also can effect these characteristics, but control of viscosity seems to be the more important factor. The ideal viscosity for any sealant will be a function of the pore size of the porous part to be impregnated, and can be determined easily with a minimum of routine tests.

The monomers described above are given anaerobic characteristics by incorporating therein an appropriate polymerization initiator system. The initiator must be capable of inducing polymerization of the monomer or monomers in the substantial absence of oxygen, and yet remain incapable of inducing polymerization as long as oxygen is present. Since the unsaturated monomers used as impregnants in this invention are conveniently cured through a free radical mechanism, the most common initiator system is a redox polymerization initiator, i.e., an ingredient or a combination of ingredients which produce an oxidation-reduction reaction, resulting in the production of free radicals. The most common initiator systems of this type are those involving peroxy materials which, under the appropriate conditions, decompose to form peroxy free radicals.

A class of peroxy initiators which has been found readily adaptable to the anaerobic concept, and particularly efficient when used in combination with the acrylate monomers described above, are the hydroperoxy initiators. Of this class, the organic hydroperoxides and compounds such as peracids and peresters which hydroylze or decompose to form organic hydroperoxides are the most preferred. Cumene hydroperoxide has been used with particular success.

These hydroperoxide initiators are very effective when used in the impregnation system disclosed herein since many of the metal articles which are to be impregnated coact with the hydroperoxides to form an effective redox polymerization initiator. In the presence of many metals, the rate of decomposition of the hydroperoxides to form free radicals is greatly increased, thus producing rapid cure of the monomer if the inhibiting effect of oxygen is absent.

For purposes of versatility, it frequently is desirable to incorporate in the impregnant an additional ingredient to complete the redox initiator system, and thus eliminate the dependence upon the nature of the article to be impregnated. For example, various classes of accelerators of hydroperoxide decomposition fall in this category. Typical examples are tertiary amines such as tributyl amine, sulfimides such as benzoic sulfimide, formamide, and compounds containing transition metals, such as copper octanoate.

While the amount of redox polymerization initiator in the impregnant can vary over wide ranges, it is impractical for such an initiator to comprise more than about 10% by weight of the impregnant, and it preferably does not comprise more than about 5% of the impregnant by weight. Most preferably the redox polymerization initiator comprises from about 0.2% to about 3% by weight of the impregnant. The weight percent of the redox polymerization initiator in the impregnant should not be allowed to decrease below about 0.1%, since below that level the cure of the impregnant will be unduly slow.

If the second component of the peroxidic redox system is added to the impregnant along with the peroxidic material, the weight ratio of these components can vary considerably depending upon the specific materials chosen, and the nature of their interaction. As a general rule, however, the ratio of peroxidic material to the second component is from about 1:0.001 to about 1:1. The most effective balance between the two components easily can be determined with a minimum of routine testing.

A particularly desirable method of incorporating the redox initiator system in an impregnant containing an acrylate monomer having at least one ether linkage (such as the monomers of Formula 1, above, where $n$ is greater than 1), is by subjecting the impregnant composition to oxygenation. This generally is accomplished by continuously bubbling oxygen (pure oxygen, air, ozone) through the acrylate monomer or monomers. The monomeric composition will be given anaerobic properties as a direct result thereof. It is believed that a portion of the oxygen becomes combined with a portion of the monomer to form "native" hydroperoxides on the monomer. Polymerization traceable to this native hydroperoxide content is inhibited by uncombined oxygen and hence the composition will not polymerize as long as the oxygenation is continued. This system is superior in that a single substance (the oxygen) serves both to initiate and stabilize the impregnant. It has been found desirable to incorporate a small amount of hydroperoxide, previously oxygenated acrylate monomer, or other accelerator of native hydroperoxide formation into the impregnant prior to the time when oxygenation begins. This has been found to shorten the activation period, e.g., the period required to impart to the impregnant the ability to cure in the absence of oxygen. For an expanded discussion of systems of this type, reference may be made to U.S. Pat. 2,628,178 of Nordlander, issued Feb. 10, 1953.

In the oxygenated system, oxygenation should be continued until the "active oxygen content" (as described in the next paragraph) reaches a suitably high level to insure reasonably rapid polymerization of the impregnant once it has been drawn into the porous metal article. Generally this level is at least about 0.1% by weight of the impregnant. As a practical matter, the active oxygen content should not exceed about 5% by weight of the impregnant. The most desirable range has been found to be from about 0.2% to about 1.0% by weight of the impregnant.

Active oxygen content can be determined by the method described in the above mentioned Nordlander patent, as follows. From about 0.01 to about 0.05 gram of the oxygenated monomer is weighed into a flask and about 10 milliliters of glacial acetic acid and a small pellet of Dry Ice are added thereto. After sufficient Dry Ice has evaporated to expel the oxygen from the flask, about one milliliter of a saturated aqueous solution of potassium iodide is stirred into the above ingredients. Using a loosely fitting stopper to retain the inert atmosphere, the mixture is heated for about 15 minutes in a 60° C. oven. About 10 milliliters of water is added after removing the flask from the oven, and the warm solution is promptly titrated with about 0.1 normal sodium thiosulfate, using the disappearance of the iodine color as the end point. The active oxygen content then may be determined from the following formula:

$$\frac{(\text{milliliters } Na_2S_2O_3)(\text{normality } Na_2S_2O_3)0.8}{\text{weight monomer sample (gms.)}} = \% \text{ active oxygen}$$

Frequently it may be desirable to add one or more co-monomers to the acrylate system to, e.g., modify the viscosity, solvent resistance, or other characteristics of the cured or uncured impregnant. While a mixture of acrylates often can be used successfully, other unsaturated co-monomers can be used as well. These co-monomers generally will be monomers capable of relatively rapid vinyl-type polymerization so that they can copolymerize, at least to a limited extent, with the reactive acrylate monomers. For example, alkyd resins such as (dimethyldiphenyl methane)-fumarate and diethyleneglycol maleate phthalate, and other unsaturated monomers such as diallylphthalate and dimethylitaconate can be used successfully. Likewise prepolymers of the above named co-monomers up to about molecular weight 3000 can be used.

When non-acrylate co-monomers are used, they preferably should not be used in amounts which exceed about 50% of the total weight of the acrylate monomer in the system. Other ingredients can be added to the impregnant as well, provided they do not adversely affect the intended sealing function of the composition. For example, coloring agents, plasticizers and inhibitors may be used in these compositions in appropriate amounts without affecting the utility of the composition.

(C) The curing agent

The impregnant described above, when used to seal porous metal articles, cures under the anaerobic conditions of the interior of the article to form a hard, durable resin. However, at the surface of the article there is sufficient contact with oxygen to leave a thin film of the impregnant in the uncured, or more likely, partially cured state. This film is undesirable since the uncured impregnant can contaminate its surroundings upon removal by normal abrasion or by various liquids. More important, this film tends to interfere with the subsequent painting or plating operations which freqeuntly are performed upon the metal articles, and generally will be removed during the painting or plating operations to contaminate any painting or plating baths which are used.

The curing agent which is used to completely cure the impregnant film at the surface of the porous metal article must be capable of driving the polymerization reaction to completion before significant uncured impregnant is removed from the article. Without this rapid curing ability, it is likely that a portion of the uncured or partially cured impregnant will be removed from the pores near the surface of the metal article. When this occurs, the part frequently is no longer usable. While the surface characteristic requirements for the metal parts will vary with the intended use of the final part, as well as with the type of metal involved and the method of preparation of the porous metal piece, it can be said as a general rule that the cured impregnant cannot be removed to a depth of below about one thousandth of an inch in order to insure proper plating and painting characteristics in the final product.

The most acceptable type of curing agent has been found to be a free-radical polymerization accelerator dissolved in an organic solvent. The organic solvent serves to remove the uncured impregnant on the surface of the porous metal article; but, surprisingly, as long as the polymerization accelerator is sufficiently active, the uncured or partially cured impregnant within the pores will be polymerized before the solvent is capable of removing any significant portion of it. A large number of organic solvents are useful in this regard but the most desirable, because of their excellent cleaning ability, are the halogenated hydrocarbons, particularly chlorinated and/or fluorinated hydrocarbons, such as methylene chloride, trichloroethylene, methylchloroform, and trichloromonofluormethane. Other solvents which may be used are lacquer type solvents such as acetone, methylethylketone, methylisobutylketone and ethylacetate, and also such solvents as xylene, benzene, and toluene. While somewhat less desirable, alcoholic solvents can be used, such as methyl alcohol, ethyl alcohol, butyl alcohol, and isopropyl alcohol. Naturally, mixtures of solvents can be used.

When water soluble impregnants are used, water or other aqueous based solvents may be used, provided the free-radical polymerization accelerator also is soluble in the acqueous solvent. An excellent aqueous based curing agent is sulfurous acid. If a normally gaseous or liquid free-radical accelerator is available, the accelerator may be used in its pure state without dissolving the accelerator in a solvent of any type. Naturally, the ability to clean the outer surfaces of the impregnated part may be reduced under these circumstances, but cleaning ability is not absolutely essential for all applications. A typical liquid curing agent of this type is tributylamine, and a typical gaseous one is sulfur dioxide.

Any accelerator of free-radical polymerization meeting the qualifications described above may be used in the process of this invention. From the large number of classes of such accelerators available, those listed below are preferred since all of such classes are capable of performing with particular efficiency for the purposes disclosed herein.

(1) Aldehyde-amine condensation products

Typical examples of these materials are in United States Pat. 2,578,690 to Gerhart, issued Dec. 18, 1951. Aldehyde-amine condensation products are complex mixtures of large numbers of compounds. While it is not known which compounds are the key components, it is known that significant accelerating ability will be achieved over wide ranges of aldehyde to amine ratios in the reaction mixture. Preferably the reaction mixture contains from about 1.0 to about 3.5 moles of aldehyde for each mole of amine which is used and, most preferably from about 1.5 to about 3.0 moles of aldehyde for each mole of amine. More efficient condensation has been found attainable in acidic reaction mediums, such as in the presence of carboxylic acids. Condensation reaction temperatures of from about 20° C. to about 175° C. can be used, but the optimum reaction temperatures are between about 50° C. and about 100° C.

The nature of the aldehydes used in the condensation products of the bonding accelerators disclosed herein have not been found to be critical to the broad concept of this invention. However, while some accelerating ability can be obtained by the use of aromatic aldehydes (such as benzaldehyde and naphthaldehyde), the aliphatic aldehydes have been found to be strongly preferable. For general purposes, the applicable aldehydes can be represented by the formula $R^4CHO$ wherein $R^4$ is a hydrocarbon group containing up to about 12 carbon atoms. Naturally, $R^4$ can contain any substituent or linkage, hydrocarbon or otherwise, which does not affect the condensation product adversely for the purposes disclosed herein.

Similarly, the nature of the amine is not critical for purposes of this invention, i.e., aliphatic or aromatic amines can be used. While the primary amines are preferred for use in preparing the condensation products, aliphatic or aromatic secondary amines also can be used. For general purposes, the applicable amines can be represented by the formula $R^5R^6NH$, wherein $R^5$ is a hydrocarbon radical containing up to about 14 carbon atoms, and $R^6$ is either hydrogen or $R^5$. Naturally, either $R^5$ or $R^6$ can contain any substituent or linkage, hydrocarbon or otherwise, which does not affect the condensation product adversely for the purpose disclosed herein.

Typical examples of aldehyde-amine condensation products which are useful in the invention disclosed herein are the following: formaldehyde-p-benzylaniline; acetaldehyde-benzylamine; butyraldehyde-butylamine; butyraldehyde - aniline; hydrocinnamaldehyde - butylamine; naphthaldehyde-o-toluidine; and heptaldehyde-N-allylaniline.

(2) Sulfur containing free radical accelerators

While large varieties of sulfur containing free-radical accelerators will be known to the reasonably skilled worker of the art, three classes of sulfur containing free-radical accelerators have been found particularly useful, and are as follows:

(a) Organic thiols, e.g., compounds of the formula $R^7SH$. The nature of $R^7$ is not critical, but should be of such nature as to meet the solubility criteria described above. For reasons of practicality and usefulness, $R^7$ preferably is a hydrocarbon radical containing up to about 10 carbon atoms. Naturally, $R^7$ can contain any substituents or linkages, hydrocarbon or otherwise, which do not affect adversely the performance of the thiol for the purposes disclosed herein. Typical examples of suitable thiols are dodecylmercaptan, octylmercaptan, phenylene dimercaptan, dithioacetic acid, thioglycolic acid, thioglycerol and thiobenzyl alcohol;

(b) Organic disulfides, e.g., compounds of the formula $R^8$—S—S—$R^9$, wherein $R^8$ and $R^9$ are each the same as $R^7$, as defined in (a) above. Typical examples of suitable disulfides are phenyldisulfide, ethyldisulfide, benzothiazyl disulfide, tetramethylthiuram disulfide and dipentamethylenethiuram disulfide; and (c) The most highly preferred class of the sulfur-containing compounds, organic compounds containing either a

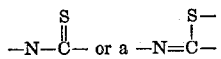

group. The NCS arrangement appears to be the critical factor in compounds of this type, and the nature of the remainder of the molecule is not felt to be determinative of the compound's workability for purposes of the broad concept of this invention. For example, designating the pertinent compounds by the formulae

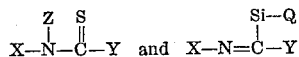

either or both of X and Z can be H or $R^{10}$, wherein $R^{10}$ is an alkyl, cycloalkyl, aryl, aralkyl or other hydrocarbon radical containing up to about ten carbon atoms. Similarly, Y can be H, $R^{10}$, SX, NXY, or N—$R^{10}$, $R^{10}$, X and Y being as defined above. Similarly, Q can be H, $R^{10}$, SX or another

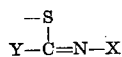

group, all as defined above.

The above-described hydrocarbon groups can contain one or more substituents or linkages, hydrocarbon or otherwise, which do not affect the sulfur-containing compound adversely for the purposes of the invention disclosed herein. For example, the compounds frequently can contain such substituents as hydroxy, halo, thio or amino substituents, and such linkages as ether, thio, and imino linkages, without affecting the workability of the sulfur-containing compounds in the bonding accelerators disclosed herein.

Frequently the X and Y substituents are united to form a heterocyclic ring which includes the nitrogen and carbon atoms of the

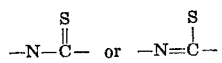

groups, i.e.,

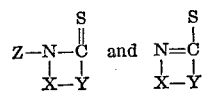

(As used herein, "heterocyclic ring" includes a polynuclear heterocyclic ring system, such as those mentioned hereinafter.) For example, this heterocyclic ring may take the form of a pyrrole, pyrazole, isoazole, oxazole, isoxazine, oxazine or, most preferably, thiazole heterocyclic ring, or of a polynuclear heterocyclic ring system, such as an indole, isobenzazole, isoquinoline, quinoline or, most preferably, benzothiazole polynuclear ring system. Compounds wherein in the X and Y substituents are united in a heterocyclic ring structure are preferred embodiments of this invention. These compounds have been found to have particularly acute accelerating properties when used with the anaerobic impregnant disclosed above.

Typical examples of compounds which fall within the above description of bonding accelerators for use in the invention disclosed herein are the following: thioacetamide, tetramethylthiuram disulfide, thiocarbanilide, copper dimethyldithiocarbamate, thiourea, N,N'-dicyclohexyl thiourea and 1-allyl-2-thiourea. Typical examples of bonding accelerators wherein X and Y are joined to form a heterocyclic ring, as defined above, are s-triazole-3-thiol, 2-mercapto thiazoline, mercaptobenzothiazole, N-cyclohexylbenzothiazole 2-sulfonamide, N-oxydiethylenebenzothiazole-2-sulfonamide, and 5-amino - 2 - benzimidazolethiol.

(3) Compounds containing an oxidizable transition metal

The transition metals are those metals which have their valence electrons in a $d$ subshell. They comprise Classes IIIb, IVb, Vb, VIb, VIIb, VIIIb and Ib on the Periodic Chart of the Elements. Experience has shown the preferred group of transition metals is that composed of iron, copper, cobalt, nickel and manganese. The presence of the transition metal in the lower oxidation state appears to be the essential characteristic for the purposes of this invention, and the remainder of the compound does not appear to be critical. For example, inorganic compounds containing these transition metals can be used, such as the metal salts which are exemplified by the bromides, chlorides, phosphates, sulfates, sulfides and oxides of the transition metals. However, for the solubility reasons noted previously it is preferable to use organic compounds which contain the transition metal.

A particularly useful class of metal-containing organic compounds has been found to be the organic chelated metal complexes of the above described transition metals. The organic chelated metal complexes are compounds containing a metal ion which is bound into a ring structure via residual unshared electrons of two or more neighboring atoms. Examples of compounds which commonly are found to form chelated metal complexes are β-diketones and ethylene and propylene diamines. Typical examples of chelated metal complexes which can be used in the bonding accelerators of this invention are iron pentanedione, copper pentanedione, cobalt pentanedione, copper propylenediamine and copper ethylenediamine.

Another class of useful organic compounds are those of the formula $R^{11}OM$, where M is the transition metal and $R^{11}$ is the residue of the organic acid or alcohol $R^{11}OH$. Typical examples of compounds of this type are iron naphthanate, nickel naphthanate, cobalt naphthanate, manganese naphthanate, copper octoate, iron hexoate, iron propionate and copper hexoate.

In addition, pure organometallics (compounds containing a direct carbon to metal bond) can be used. However, compounds of this type are not easily produced in lower valence states.

It should be noted that while theory dictates the transition metal be in an oxidazable state, many metal compounds containing metal atoms which appear to be in a fully oxidized state will work acceptably in the bonding accelerators of this invention.

While the inventors do not wish to be bound to any particular theory, these results appear to be traceable to, inter alia, the following two possible factors. First, invariably a percentage of the metal compound will be in one or more oxidation states other than the highest one. Secondly, the compositions disclosed herein may contain a sufficiently active reducing agent that a portion of the metal moiety of many of metal compounds will be reduced to a lower oxidation state. While it is clearly understood that all of such systems are within the broad scope of this invention, the invention herein is expressed in terms of "oxidizable transition metals" since that appears to be the condition which exists at the time of use of the products and processes disclosed herein.

The process

The type of equipment which is used in performing the sealing operation of the invention disclosed herein is not critical. Depending upon the size, shape and type of porous metal articles to be sealed as well as the number of articles to be sealed per unit of time, a large number of different types of commercially available equipment can be used. For example, when very few and very small porous metal articles are to be impregnated, a shallow laboratory dish may be adequate, since in this shallow dish adequate contact with atmospheric oxygen will be retained thereby providing the necessary stability to the liquid impregnant.

Also, if a small impregnating operation is adequate, a small tank equipped with vigorous agitation will be suitable since the agitation will continuously bring the impregnant in contact with atmospheric oxygen, again insuring the suitable stability of the impregnant. This is particularly true with lower viscosity impregnants, such as about 25 centipoises or less. By far the most useful and most desirable system, and a preferred embodiment of this invention, is that wherein the impregnation vessel is equipped with one or more aeration lines to provide a continuous flow of oxygen to the impregnant. As described above, this same method can be used to impart anaerobic characteristics to certain acrylate monomers. With any type of anaerobic system the aeration does provide the necessary stability since fresh atmospheric oxygen is continuously provided to the entire mass of impregnant, and not just that which is near the top surface. The aeration also provides agitation which will impart the necessary movement in the liquid to stabilize the entire composition and thereby prevent localized curing, such as near the outside walls of the liquid impregnant where the aeration does not necessarily penetrate. The amount of aeration may vary over wide ranges depening upon the specific impregnant selected and the size and geometry of the equipment which is used. Naturally, for optimum results the air which is bubbled into the liquid impregnant should be distributed adequately throughout the entire mass of liquid. It has been found, for example, that with a normal tank containing from about 10 to about 50 gallons of the liquid impregnant, an air flow rate of from about 0.5 to about 5.0 cubic feet per minute is more than adequate to provide the necessary stability.

The minimum amount of air which must be provided is that which will keep the liquid anaerobic material from polymerizing for a reasonable period of time, such as about one week or more, to permit its use in sealing operations. While no precise minimum figure can be given since this figure will vary from one composition to the next, it can be said that a safe lower limit for the systems described herein would be a volume of air per hour which is equal to about ten percent of the volume of the impregnant contained in the impregnation vessel.

Concerning the upper limit, convenience and economics are ultimately the determining factors since extremely high flow rates are more wasteful than harmful to the system. A practical upper limit would be a volume of air equal to the volume of the impregnant in the impregnation tank.

When articles of uniform porosity are used, and the articles are to be sealed only against low pressure, it is possible to impregnate them by use of a dipping technique. When the article is submerged into the anaerobic impregnant, the low viscosity and the low surface tension of the impregnant will permit its penetration a suitable distance into the porous article. Acrylate materials are particularly efficient in this respect. Upon curing, an adequate seal against low to moderate pressures is found to exist.

For sealing against higher pressures, or for maximum reliability, and durability, usually it is necessary to evacuate the pores of the porous metal article to insure their filling with the impregnant. This generally is accomplished by placing the porous articles in a vacuum vessel, sealing the vessel and then drawing a vacuum within it, and retaining such vacuum until the pores of the porous metal article have been suitably evacuated. While any degree of evacuation can be used which is adequate to suitably seal the porous article for its intended function, it is generally desirable to evacuate the porous metal article sufficiently to permit at least about 50% of the available void space of the article to be filled with the anaerobic impregnant. Most preferably, at least about 80% of the available void space of the porous metal article is evacuated and filled with the impregnant. The most desirable method of accomplishing this evacuation is by submerging the porous metal pieces in the anaerobic impregnant while the articles are contained in the vacuum vessel. When a vacuum is drawn on the vessel, the gases in the interstices of the porous metal articles will be removed. The vacuum is then released while the porous articles are still covered by the anaerobic impregnant. The increased pressure will drive the anaerobic sealant into the evacuated interstices, thus completing the impregnating operation. Upon cure, the anaerobic sealants will form a hard and durable seal.

Alternate manipulations may be apparent to the reasonably skilled worker in the art for using the invention disclosed herein to seal the porous metal articles. However, these are deemed to be within the scope of the present invention. For example, it is possible to place the articles in an empty pressure vessel, evacuate the vessel to remove the gases from the interstices of the metal pieces, and then insert the sealant in the vessel. After sufficient sealant has been placed in the vessel to cover the porous metal pieces, the vacuum then can be released to complete the sealing operation.

The temperature at which the impregnation operation is conducted is determined by the stability of the impregnant. Since the stability of the anaerobic impregnant decreases with increasing temperature, as a general rule it is undesirable to maintain temperatures of above about 120° F. While the sealing operation can be completed at any temperature at which the sealant is in a liquid state, it is generally inconvenient and impractical to maintain the impregnant at extremely low temperatures. While the lower limit of the operation is basically one of convenience only, the practical limit within the context of convenient commercial operation is about 30° F. The most desirable operating range has been found to be between about 50° F. and about 85° F. For maximum convenience, operation at ambient temperatures may be used. After completing the impregnation operation, the porous metal articles may be treated immediately with the free radical polymerization accelerator, but it is preferable to allow them to drain for a short time, such as from about 5 to about 120 minutes. Preferably this time is between about 10 and about 30 minutes. This time period is particularly beneficial when the treated parts are to be painted or plated since this allows for partial cure of the anaerobic impregnant near the surface of the metal piece. While the cure will not be complete until treatment with the free radical polymerization accelerator, this partial cure will increase the resistance to removal during treatment with the curing agent and hence provide a better surface for subsequent plating or painting.

Treatment of the impregnated porous metal articles with the curing agent may be by any of a number of convenient methods, such as by spraying the pieces with a solvent solution of a free-radical accelerator of the type discussed above. When a gaseous free radical accelerator is used, the pieces may simply be sprayed with the free radical accelerator in its gaseous form. The most desirable method of treating the porous metal articles with the accelerator is by dipping the articles into a tank containing a solvent solution of the accelerator. Small pieces are conveniently placed in baskets or trays for such operations, and larger pieces may be handled individually. The length of the treatment need only be such that adequate cure of the sealant near the surface of the porous metal piece is produced. While this time will vary from one accelerator to another, it may be said as a general rule that from about 3 seconds to about 10 minutes defines the normal operating range, although substantially longer times may be used without adverse effect in most instances. With the preponderance of the free-radical polymerization accelerators discussed above, from about 5 seconds to about 2 minutes will provide acceptable results.

The temperature of the treatment with the free radical accelerator is not critical for purposes of this invention, although the effectiveness of the treatment diminishes with decreasing temperature. Generally, any treatment above about 40° will be adequate, and preferably such treatment is between about 50° F. and 100° F. Since one of the most highly desirable features of the impregnation process described herein is the ability of the cure to proceed without any specific heat cycle, the most desirable operation is at ambient temperatures. The choice of the absolute upper limit of the operation is basically one of convenience only, but generally will be determined by the nature of the solvent or solvents used. However, as indicated above, higher temperatures are not required or utilized in the preferred aspects of this invention.

Also as indicated above, the use of a solvent in conjunction with the accelerator of free radical polymerization provides the additional benefit of cleaning without adversely affecting the plating or painting characteristics of the article after the sealing operation has been completed. Use of this solvent solution of accelerator has been found to produce excellent surface cleaning, which is particularly important in complex articles containing threaded holes and other interior openings. Cured sealant in such locations often impairs the intended function of the article. As noted above, this cleaning is accomplished without removing significant amounts of the impregnant from the interstices of the article (e.g., more than one thousandth of an inch into the porous article). After the completion of the above described operations, the solvent is allowed to evaporate from the surface of the casting. Generally, it has been found that the sealed metal articles develop the ability to withstand substantial pressures (e.g. at least about 25 p.s.i.g.) within a matter of minutes following the treatment with the curing agent. It is advisable to avoid testing or using the pieces at elevated pressures (e.g. greater than about 100 p.s.i.g.) until about 30 minutes from the completion of the impregnation step, and at least about 15 minutes from the completion of the treatment with the free-radical polymerization accelerator. This time period allows the anaerobic cure to proceed to near completion, at which time time the sealed porous metal articles are ready for subsequent treatment, such as plating or painting.

The following examples are given to demonstrate the use of the components and processes of the invention described above in the impregnating and sealing of various porous articles. These examples are not intended to be a limitation upon the claims. Unless stated to the contrary, all ratios and percentages given below are on a weight basis.

EXAMPLE I

A blend of acrylate monomers was prepared by mixing ⅔ by weight triethyleneglycol dimethacrylate with ⅓ by weight lauryl methacrylate. To this mixture was added approximately 1% by weight cumene hydroperoxide, approximately 0.3% by weight benzoic sulfimide, and about 3 parts per million by weight copper (as copper octanoate). Approximately 20 gallons of this final mixture was transferred to a vacuum tank (approx. 10 cu. ft.) equipped with flexible connections to a vacuum pump. A one-quarter inch polyethylene aeration line was connected from the bottom of the tank to an air compressor. Aeration was commenced immediately upon transfer of the impregnant to the tank, air being supplied at a pressure of 6 p.s.i.g.

To test the stability of the impregnant, aeration was continued for approximately two days during which time the anaerobic mixture remained liquid. No significant change in viscosity was noticed, indicating the absence of any significant amount of polymerization.

The mixture was then used to impregnate die-cast aluminum parts (rectangular solid meter housings, approximately 3" x 2" x 1¾"). The parts contained ten threaded "blind" holes. Prior to impregnation the aluminum parts were water washed and vapor phase degreased to insure cleanliness. The cleaned parts were placed in a stainless steel rack and suspended in the impregnation tank with the parts completely submerged in the impregnant. The tank was closed, sealed, and the air was evacuated by means of the vacuum pump.

An absolute pressure of approximately one inch of mercury was reached in less than two minutes, and this vacuum was maintained for about ten minutes. Thereafter the vacuum pump was turned off and the pressure in the tank gradually increased by means of bleed valve. After the pressure had reached atmospheric pressure, the tank was opened and the tray of impregnated parts was removed from the liquid and allowed to drain for about five minutes. The tray then was taken and submerged in a trichloroethylene solution containing 10% isopropanol, 2% mercaptobenzothiazole and 2% dimethyl paratoluidine, the last two of which are accelerators of free radical polymerization. After 10 seconds the tray was removed and the parts were allowed to stand for about six hours at room temperature to allow full hardening of the sealant to take place.

The sealed porous metal pieces were found to have a smooth, clear surface with no visible evidence of sealant on any of the outer surfaces, including the inner surfaces of the blind holes. However, the sealant was found to have cured essentially to the outer surface of the castings. The process was used to impregnate 300 of the die-cast aluminum parts, after which all were tested at a pressure of 200 p.s.i.g. No leaks were found to occur in any of the 300 pieces.

EXAMPLE II

The equipment, anaerobic impregnant, and accelerator of free radical polymerization described above in Example I were used to impregnate sintered powdered iron cams weighing approximately one ounce each. The only difference in processing from that described in Example I is that the vacuum cycle was not used during the impregnation step; instead, the trays containing the sintered iron parts were dipped into a sealant and allowed to remain in that position for about approximately twenty minutes. Thereafter the parts were drained, treated with the rinse solution containing the free radical polymerization accelerators and allowed to cure for six hours at room temperature.

It was found that a significant percentage of the gases contained within the sintered metal parts was removed by the low viscosity sealant which penetrated into the parts. (This penetration was evidenced during the impregnation operation by the rising of minute gas bubbles from the surface of the metal parts. Large numbers of these bubbles were observable immediately after dipping the trays of porous metal parts into the sealant, and the number gradually diminished and had totally subsided prior to the end of the twenty minute impregnation step.) After allowing the impregnant in the parts to cure for about six hours the parts were found to be sealed against low pressures, all parts being capable of withstanding a pressure of at least about 20 p.s.i.g.

EXAMPLE III

Approximately 150 ml. of triethyleneglycol dimethacrylate containing 1% by weight benzoyl peroxide was placed into a 250 ml. vacuum flask. Air from a laboratory compressed air outlet was gradually bubbled through the mixture. The aerated mixture was found to be stable at room temperature as evidenced by its remaining liquid with no appreciable increase of viscosity over a period of about 48 hours. Thereafter the aerated mixture was used to impregnate a series of sintered powdered iron cams weighing about 1 ounce each. Aproximately ten of these porous metal articles were placed in the vacuum flask, completely submerged in the anaerobic impregnant. The flask then was evacuated to an absolute pressure of about 0.5 inch of mercury, and maintained at that level for approximately ten minutes. The vacuum pump then was turned off and the pressure in the vacuum flask allowed to return gradually to atmospheric level over a period of about one minute. The impregnated parts then were removed and allowed to drain for about five minutes, after which they were dipped in the solution of free-radical accelerator described in Example I, above. After ten seconds the parts were removed and allowed to stand overnight to permit full hardening to take place. The parts then were tested at 200 p.s.i.g. and all were found to be effectively sealed.

The materials and process described above in this example were then used to impregnate sintered brass test pieces (discs, approx. one inch in diameter by one-sixteenth inch thick) weighing approximately 0.2 ounce. The parts were successfully impregnated and were found to be effectively sealed against a pressure of at least 20 p.s.i.g. when tested after being allowed to cure overnight.

EXAMPLE IV

The anaerobic sealant described in Example III above was used in combination with a cellulose acetate butyrate resin to prepare a higher viscosity impregnant. The resin had a solution viscosity (ASTM D 1343–54T) of about 25 seconds. The weight percent acetate was 21% the weight percent butyrate was 28%, and the weight percent of hydroxyl was 2.5%. The more viscous impregnant was prepared by adding cellulose acetate butyrate resin in three increments to the triethyleneglycol dimethacrylate. After each incremental addition, the blend was mixed until all of the resin was completely dissolved. After about 0.5 ounce of the resin was dissolved in about 1.6 pounds of the dimethacrylate, the remainder of the anaerobic sealant ingredients were added. The viscosity of the final mixture was 125 centipoise. The mixture was transferred immediately to a one liter beaker and aerated by the use of laboratory compressed air. The aerated sealant was found to be a stable composition at room temperature as evidenced by its remaining liquid over a period of 48 hours with no apparent increase in viscosity.

The anaerobic sealant was then used to impregnate a stainless steel disk (15 mm. diameter, 3 mm. thick) having a known porosity of about 100 microns. The disk was dipped into the sealant for 15 minutes, then removed and immediately rinsed for about 10 seconds in the solution of free radical polymerization accelerator described in Example I, above. After allowing about 30 minutes for cure, the disk was found to be free of leakage when tested at 20 p.s.i.g.

EXAMPLE V

A sintered iron timing gear (approximately 3" diameter, 1" thick) was impregnated in preparation for plating. The impregnant was composed of the following: polyethylene glycol dimethacrylate (average molecular weight=330) 97.3% by weight; cumene hydroperoxide, 2% by weight; dimethylparatoluidine, 0.4% by weight; and benzoic sulfimide, 0.3% by weight. This anaerobic impregnant was found to be stable under aeration, as described in the previous examples. The gear was impregnated using the general method described in Example I, above, utilizing a ten-minute vacuum cycle, followed by a ten-second dip in the solvent solution of free-radical polymerization accelerator described in Example I, above. The gear then was allowed to stand for 72 hours at room temperature.

A second gear was impregnated using a slightly more viscous impregnant prepared by mixing 75% by weight of the sealant described in Example I with 25% by weight of a more viscous acrylate resin containing 0.1% by weight cumene hydroperoxide. The more viscous resin was the reaction product of two moles hydroxyethylmethacrylate with one mole of the reaction product of dimethyldiphenylmethane with two moles of toluene diisocyanate. The final viscosity of this sealant was approximately 20 centipoise at room temperature. The method used to impregnate the second timing gear with this more viscous impregnant was the same as that used for the first timing gear, described in this example.

Both gears were subject to an electrolytic zinc plating process. The plated gears were found to have an excellent finish essentially free of surface pits and other blemishes which are customarily encountered in the zinc plating of parts impregnated by prior art processes.

EXAMPLE VI

A mixture of polymerizable acrylate monomers was prepared by mixing a 2:1 weight ratio of triethylene glycol dimethacrylate and lauryl methacrylate. An anaerobic impregnant was prepared by adding to this mixture 1% cumene hydroperoxide and about 1.2% tributylamine. About 500 cubic centimeters of this anaerobic impregnant were placed in a one liter vacuum vessel and aerated with laboratory compressed air. Four parts per million of copper (as copper octoanate) then were added to the aerated mixture.

The anaerobic mixture was then used to impregnate sintered iron cams weighing about one ounce each, using the method generally described in Example I, above. The solution of accelerator of free radical polymerization was the same as described in Example I. After allowing the parts to cure overnight, they were found to be suitably sealed when tested at a pressure of about 40 p.s.i.g.

EXAMPLE VII

The impregnation procedure of Example I was repeated, substituting 4 parts per million cobalt (as cobalt pentanedione) for the copper. Essentially similar results were obtained in that the impregnated parts were sealed effectively against pressures of at least about 100 p.s.i.g.

EXAMPLE VIII

The impregnant and impregnation procedure of Example I were used to seal one-ounce sintered iron cams, but utilizing the following solution as the curing agent, the first two listed components being accelerators of free-radical polymerization.

| Component: | Aprox. wt. percent |
| --- | --- |
| 1,2-diaminopropane | 0.5 |
| Copper-2-ethylhexoate | 1.5 |
| 1,2-propylene glycol | 3 |
| Butanol | 30 |
| Trichloroethylene | 65 |

Essentially similar results were obtained in that the porous metal articles were sealed effectively against pressures of at least about 100 p.s.i.g.

When in the above example the solvent solution of accelerator of free radical polymerization is replaced in whole or in part by a solvent solution containing a comparable amount of any of the materials listed below, or a mixture thereof, substantially similar results are achieved in that the impregnated articles are effectively sealed substantially to the outer surface thereof to produce surfaces which can be successfully plated or painted:

(1) The reaction product of two moles of butyraldehyde with one mole of butylamine.
(2) The reaction product of three moles of acetaldehyde with one mole of benzylamine.
(3) Octylmercaptan.
(4) Ethyldisulfide.
(5) 1-allyl-2-thiourea.
(6) Copper dimethyldithiocarbamate.
(7) Cobalt naphthanate.
(8) Copper pentanedione.
(9) Dimethyl-p-toluidine.

EXAMPLE IX

An anaerobic impregnant was prepared which consisted of the following approximate compositions, expressed in percent by weight

| | Percent |
|---|---|
| Hydroxyethyl methacrylate | 97.7 |
| Cumene hydroperoxide | 2.0 |
| Benzoic sulfimide | 0.3 |
| | 100.0 |

To this mixture was added 3 parts per million by weight of copper (as copper octanoate). Two 250 milliliter beakers were filled approximately half full with this impregnant, and each was aerated with laboratory air for approximately one-half hour. Thereafter, one of such beakers was placed in a desiccator, and three one inch diameter by one-eighth inch thick sintered iron test pieces were placed in the impregnant. A vacuum was drawn on the desiccator (absolute pressure of less than one inch of mercury) for about ten minutes. The vacuum was released, the test pieces removed, and aeration again applied to the impregnant. At this same time aeration to the beaker of impregnant which had not been used in the impregnation operation was discontinued. The test pieces were placed for approximately fifteen seconds in the solvent solution of free radical accelerators described in Example I.

After about eight hours, the two breakers of impregnant and the test pieces were observed. The impregnant which had been used in the impregnation operation and was subsequently aerated had shown no change in viscosity, whereas the impregnant wherein aeration had been discontinued had begun to gel, indicating substantial polymerization had started to take place. The test pieces were found to be effectively sealed as shown by their successfully withstanding a pressure test at 40 p.s.i.g.

EXAMPLE X

The exact procedure of Example IX was repeated, except that butyleneglycol dimethacrylate was substituted for the hydroxyethyl methacrylate. Results were obtained which were substantially similar to those described in Example IX, above.

EXAMPLE XI

To demonstrate the impregnation of porous parts other than metal parts, the materials and processes described in Example I, above, were used to impregnate wooden (birch) gun stocks. To seven liters of the impregnant were added 94 grams of a walnut colored dye.

Subsequent to the post impregnation treatment with the solvent solution of free radical accelerators, the gun stocks were placed in a sealed chamber equipped with a valve connection to a cylinder of compressed sulfur dioxide gas. The chamber was sealed, a bleed valve opened, and the existing atmosphere was purged with the sulfur dioxide. The gun stocks were allowed to remain in the sulfur dioxide atmosphere for about thirty minutes.

Upon examination the gun stock were found to have acquired a deep walnut color, and a hard durable water and solvent resistant finish.

We claim:
1. The process of sealing a porous rigid article which comprises impregnating the interstices of the artcile with a polymerizable anaerobic sealant comprising in a free-radical polymerizable monomer and a free-radical polymerization initiator therefor, and treating the surfaces of the impregnated article with a polymerization accelerator for the anaerobic sealant, said polymerization accelerator being contained in a liquid solvent for said anaerobic sealant.

2. The process of claim 1 wherein the polymerizable anaerobic sealant comprises a polymerizable acrylate ester monomer and a hydroperoxide polymerization initiator therefor.

3. The process for sealing a porous rigid article which comprises:
   (a) impregnating the interstices of the article with an anaerobic sealant comprising a mixture of at least one polymerizable acrylate ester monomer and a free-radical polymerization initiator therefor; and
   (b) treating the surface of the impregnated article with a polymerization accelerator for the anaerobic sealant, said polymerization accelerator being contained in a liquid solvent for said anaerobic sealant.

4. The process of claim 3 wherein the free-radical polymeriation initiator is a hydroperoxide polymerization initiator, and at least a portion of the polymerizable acrylate ester has the chemical formula $$H_2C=C-\overset{O}{\overset{\|}{C}}-O\left[-(CH_2)_m-\left(\overset{R^1}{\underset{R^3}{C}}-\overset{R^1}{\underset{R^1}{C}}-O\right)_p\right]_n-\overset{O}{\overset{\|}{C}}-C=CH_2$$
$$\underset{R^2}{} \qquad \qquad \qquad \qquad \qquad \qquad \underset{R^2}{}$$

wherein $R^1$ represents a radical selected from the group consisting of hydrogen, lower alkyl of from 1 to about 4 carbon atoms hydroxy alkyl of from 1 to about 4 carbon atoms, and $$CH_2-O-\overset{O}{\overset{\|}{C}}-\underset{R^2}{C}=CH_2$$

and $R^2$ is a radical selected from the group consisting of hydrogen, halogen, and lower alkyl of from 1 to about 4 carbon atoms; $R^3$ is a radical selected from the group consisting of hydrogen, hydroxyl, and $$-O-\overset{O}{\overset{\|}{C}}-\underset{R^2}{C}=CH_2$$

$m$ is an integer equal to at least 1, $n$ is an integer equal to at least 1, and $p$ is one of the following: 0, 1.

5. The process of claim 3 wherein the polymerization accelerator for the anaerobic sealant is dissolved in an organic solvent and cures the anaerobic sealant substantially to the outer surface of the article.

6. The process of claim 3 wherein the polymerization accelerator is selected from the group consisting of the following classes: aldehyde-amine condensation products; sulfur-containing free-radical accelerators; and organic compounds containing an oxidizable transition metal.

7. The process of claim 3 wherein the interstices are impregnated by means of a vacuum impregnation cycle wherein the vacuum is less than about 5 inches of mercury absolute pressure.

8. The process for sealing a porous metal article which comprises:
   (a) placing the article in a vacuum vessel;
   (b) drawing a vacuum within the vessel and covering the article with an anaerobic sealant comprising a polymerizable acrylate ester and a hydroperoxide polymerization initiator therefor;
   (c) releasing the vacuum to impregnate said article by forcing the sealant into the evacuated interstices; and
   (d) treating the surface of the impregnated article with a polymerization accelerator for the anaerobic sealant, said polymerization accelerator being contained in a liquid solvent for said anaerobic sealant.

9. The process of claim 8 wherein the vacuum is less than about one inch of mercury absolute pressure, and the polymerization accelerator cures the anaerobic sealant substantially to the outer surface of the article.

10. The process for sealing porous rigid articles which comprises:
(a) preparing an anaerobic sealant comprising a polymerizable acrylate ester monomer and a hydroperoxide polymerization initiator therefor;
(b) aerating the sealant in a vacuum vessel at a sufficient rate to prevent polymerization of the anaerobic sealant;
(c) submerging porous rigid articles to be sealed in the anaerobic sealant;
(d) discontinuing the aeration and drawing a vacuum in the vessel of less than about five inches of mercury absolute pressure;
(e) after the interstices of the article have been evacuated, releasing the vacuum to force the anaerobic sealant into the interstices; and
(f) removing the impregnated article from the anaerobic sealant and treating the surfaces of the article with an accelerator of free-radical polymerization, said accelerator being contained in a solvent for said anaerobic sealant.

11. The process of claim 10 wherein at least a portion of the polymerizable acrylate ester has the chemical formula

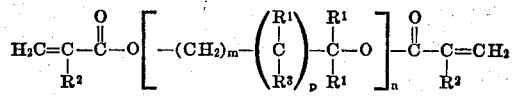

wherein $R^1$ represents a radical selected from the group consisting of hydrogen, lower alkyl of from 1 to about 4 carbon atoms, hydroxy alkyl of from 1 to about 4 carbon atoms, and

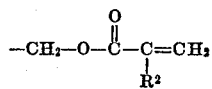

$R^2$ is a radical selected from the group consisting of hydrogen, halogen, and lower alkyl of from 1 to about 4 carbon atoms; $R^3$ is a radical selected from the group consisting of hydrogen, hydroxyl, and

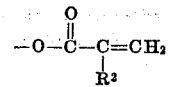

$m$ is an integer equal to at least 1, $n$ is an integer equal to at least 1, and $p$ is one of the following: 0, 1.

12. The process of claim 10 wherein the vacuum is less than about one inch of mercury absolute pressure.

13. The process of claim 10 wherein at least a portion of the acrylate ester is a polyethyleneglycol dimethacrylate, at least a portion of the polymerization initiator is cumene hydroperoxide, and the accelerator of free-radical polymerization is mercaptobenzothiazole.

14. The process of claim 10 wherein the accelerator of free-radical polymerization for the anaerobic sealant is dissolved in an organic solvent and cures the anaerobic sealant substantially to the outer surface of the article.

15. The process of claim 13 wherein the accelerator of free-radical polymerization is selected from the group consisting of the following classes: aldehyde-amine condensation products; sulfur-containing free-radical accelerators; and organic compounds containing an oxidizable transition metal.

References Cited
UNITED STATES PATENTS

| | | | |
|---|---|---|---|
| 2,376,706 | 5/1945 | Lum | 117—49 |
| 2,684,307 | 7/1954 | Knapman | 117—49 |
| 3,073,808 | 1/1963 | Mertz | 260—89.5 |
| 3,328,194 | 6/1967 | Kasper | 117—93.31 |

ALFRED L. LEAVITT, Primary Examiner

J. A. BELL, Assistant Examiner

U.S. Cl. X.R.

117—113, 119, 132 B, 132 C, 161 K